March 22, 1960     C. BANGERT, JR     2,929,966
ELECTRICAL APPARATUS ASSEMBLY WITH SEQUENCE BUSSING
Filed Dec. 13, 1954     2 Sheets-Sheet 1

INVENTOR.
Charles Bangert, Jr.
BY

ATTORNEY

March 22, 1960 C. BANGERT, JR 2,929,966
ELECTRICAL APPARATUS ASSEMBLY WITH SEQUENCE BUSSING
Filed Dec. 13, 1954
2 Sheets-Sheet 2

INVENTOR.
Charles Bangert, Jr.
BY Martin Kalikow
ATTORNEY ited States Patent Office 2,929,966
Patented Mar. 22, 1960

2,929,966

ELECTRICAL APPARATUS ASSEMBLY WITH SEQUENCE BUSSING

Charles Bangert, Jr., West Hartford, Conn., assignor to General Electric Company, a corporation of New York Application December 13, 1954, Serial No. 474,892

7 Claims. (Cl. 317—119)

My invention relates to enclosed electrical apparatus assemblies, and particularly to electrical panelboards and load centers comprising an assembly of electric circuit breakers for the control of light and power circuits in residential electrical systems.

Such panelboards and load centers ordinarily comprise two or three power supply bus bars mounted in an enclosure, and a number of circuit breakers each of which is connected to and derives power from a corresponding one of the power supply bus bars. It is very desirable in such assemblies that the number of circuit breakers connected to each bus bar shall be approximately equal, to prevent overloading of any one bus bar and to facilitate the efficient distribution of electrical power. The preceding objective is most easily attained by providing means whereby each breaker added to the assembly is connected to a different bus bar from that of the preceding breaker and in a predetermined sequence. This arrangement is generally termed "sequence bussing." Such bussing has, in the past, been provided by furnishing specially arranged and fabricated bus bar configurations and/or terminals or other connecting means. Such arrangements greatly complicate the required bus structure and accordingly increase the difficulty of fabrication and the cost of such devices.

It is an object of my invention to provide a panelboard construction having sequence bussing which does not require special adaptation of the bus bars or of the electrical connecting means between the bus bars and circuit breakers.

It is another object of my invention to provide a panelboard having sequence bussing wherein the sequence of connection is readily apparent from the front of the panelboard without the necessity of special marking.

It is a further object of my invention to provide a panelboard having sequence bussing wherein the means providing the sequence keying action is inexpensive and simple to manufacture.

In carrying out my invention I provide a panelboard including an open-front enclosure containing a plurality of bus bars, and a plurality of electric circuit breakers each selectively mountable in the enclosure by a simple plug-in action in one of a plurality of positions to make electrical connection with a corresponding one of said bus bars, a removable cover for the open front of the enclosure having openings therein permitting access to the manually operable portion of the circuit breakers, and cooperating keying means carried by the cover and by the casings of the circuit breakers requiring that the circuit breakers be assembled in the housing in a predetermined arrangement or sequence in order to permit the cover to be properly assembled in position, the cover having portions overlying the front portion of the casings of the circuit breakers to retain the breakers in place in the housing.

Other objects and features of the invention will be readily apparent to those skilled in the art from the specification and appended drawings in which.

Figure 1:
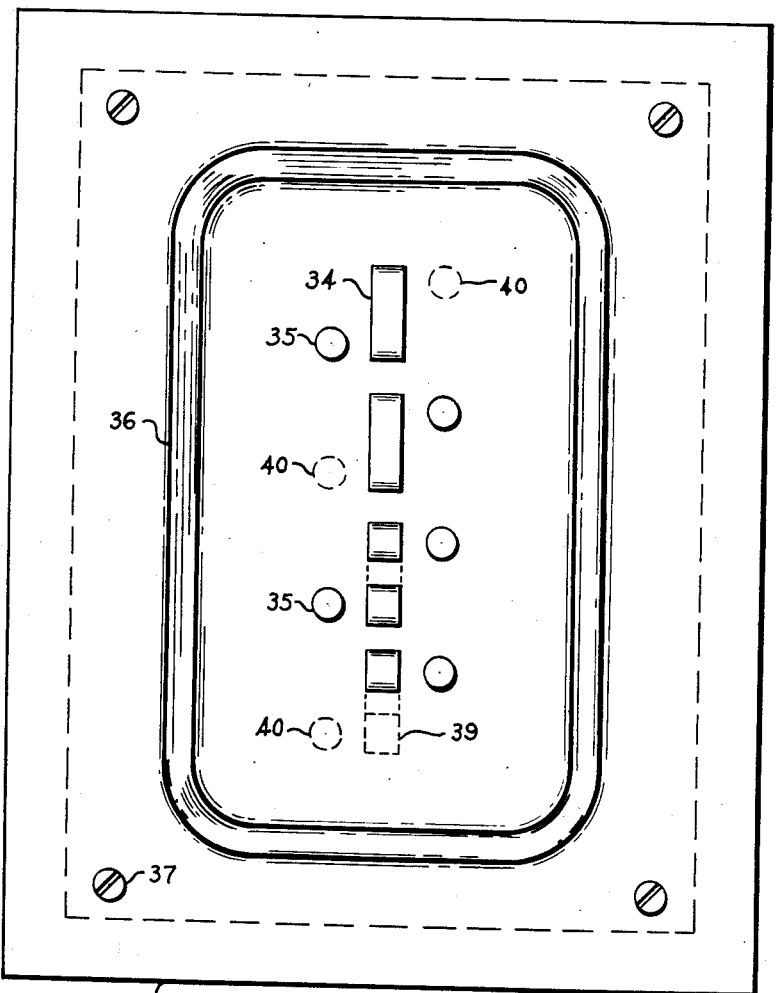
Figure 1 is a front elevation view of a panelboard embodying my invention.

Referring to the drawings, I have shown my invention in one form as applied to a panelboard comprising a generally rectangular enclosing casing 10 having a back wall 11 and top and bottom walls and side walls generally perpendicular thereto. A pair of elongated electrical bus bars 12a and 12b are mounted in the enclosure 10 by having their respective ends supported in recesses 13 in insulating blocks 14 attached to the back wall 11 by suitable means such as by screws 15. A generally rectangular sheet of thin flat insulating material 16 underlies the bus bars and insulates them from the back wall 11 of the enclosure 10.

A conductive terminal board 17 is mounted on the back wall 11 of the enclosure 10 by screws 18 and carries a number of terminal fastening means 19 comprising screws threaded in the conductor 17 and is for a purpose to be described. A number of electric circuit breakers are adapted to be supported in the enclosure 10 upon the bus bars 12a and 12b. It will be understood that the over-all dimensions of the panelboard enclosure 10 may be varied and the electrical bus bars 12a and 12b may be extended in length so as to accommodate any desired number of electrical circuit breakers. For the purpose of illustration, however, I have shown five such circuit breakers comprising two two-pole circuit breakers 20a and 20b and three single-pole circuit breakers 21a, 21b and 21c. The operating mechanism utilized in the circuit breakers 20 and 21 may be of any suitable type such, for instance, as that shown in Patent Number 2,673,267, issued March 23, 1954, to R. N. Rowe et al., and assigned to the same assignee as the present invention. The circuit breakers 21 each include a manually operable handle portion 22 of the push-button type adapted to be operated by vertically reciprocating movement in the insulating casing 23. The casing 23 is provided with two slots 24 and 25 extending inwardly from the back wall. The slot 24 provides access to a line terminal connector 26 comprising an inverted generally U-shaped resilient member connected to a contact (not shown) within the circuit breaker 21. The slot 25 has mounted therein an inverted generally U-shaped resilient clip 27 which is not electrically connected to any other part of the circuit breaker 21, but serves to assist in physically supporting the breaker in the casing 10. A load terminal 28 is provided for each breaker, mounted on the casing 23 and providing means for connecting the circuit breaker in circuit, such as by conductors 29. The casing 23 is further provided with a generally cylindrical keying projection 30 on the outer face thereof adjacent to but spaced from the operating member 22. The operating member 22 is located midway between the members 26 and 27, and the projection 30 ismounted nearer one of said members than the other. Each of the circuit breakers 21 is adapted to be mounted in the panelboard by a straight inward movement in which the connector 26 and the clip 25 each embrace one of the bus bars 12a and 12b. The connector 26 thereby makes electrical connection with one of the bus bars and connects it to a contact or conductor internally of the breaker. The clip 25 makes physical engagement with the other bus bar and adds further physical support. The circuit breakers 20a and 20b each comprise a two-pole circuit breaker including means for simultaneously controlling the electric current through two electrically separate circuits. Each of the circuit breakers 20a and 20b comprise an integral assembly, which may be compared to two single-pole breakers of the type of breakers 21 placed side by side but having their opposite ends adjacent. Each such two-pole breaker is provided with a generally elongated manually operable member 31 and generally cylindrical keying projections 32.

The panelboard is further provided with a front cover 33 adapted to substantially close the open front of the enclosure 10 and having openings 34 therein to permit the manually operable portions 31 and 22 to project therethrough, and other openings 35 to permit the generally cylindrical keying members 30 and 32 to project therethrough. The openings 34 and 35 are located in a generally central recessed portion 36 so that the manually operable portions 31 and 22 in the assembled condition project through the cover 33 but not beyond the plane of the peripheral flange portions thereof. The front cover 33 is adapted to be connected to the enclosure 10 by means of screws 37 which thread into brackets 38 carried by the enclosure 10. The cover 33 is, furthermore, provided wtih "knockout" or frangible sections such as 39 and 40 to facilitate provision of additional openings.

The circuit breakers 20 and 21 may be mounted on the bus bars 12a and 12b in either of two positions, that is, with the connector 26 engaging the bus bar 12a or in an endwise-reversed position in which the connector 26 engages the bus bar 12b. It will be understood that, when in one position, the circuit breaker is electrically connected to one bus bar, and in the other position it is electrically connected to the other bus bar. In either position, the handle portion 22 or 31 is positioned in line with the corresponding handle opening, but each circuit breaker must be mounted in a predetermined one of these two possible positions if its keying projection 30 or 32 is to be in position to coincide with the corresponding openings 35. It will now be apparent that the particular endwise position of each individual circuit breaker in the panelboard may be predetermined by providing a given pattern of openings in cover member 33. Thus the cooperation of the openings 35 in the cover member 33 and the projections 32 on the circuit breaker casings provides a keying means by which the order of the circuit breakers in the panelboard may be predetermined. If the circuit breakers are mounted in the panelboard in a position other than the desired position, it will then be impossible to assemble the cover member 33 properly. The circuit breakers 21 and 20 are held in place on the bus bars 12 and 12a by a mere frictional engagement and may be removed by a straight outward pull. Thus in the completely assembled device as shown in Figure 1 the essential retaining element of the assembly comprises the cover member 33 and the screws 37. It is, therefore, assured that when the device is in use the circuit breaker will be mounted in the desired predetermined position affording the desired distribution of loading on the bus bars 12a and 12b.

The two-pole circuit breaker 20a in the particular assembly shown is used to perform the function of a main disconnecting device, and the main line conductors, such as 41 and 42, are brought directly into the terminals 43 and 44. The electrical connecting means for each of the breakers in the two-pole breaker 20a then serves to connect a given one of the line conductors 41 to a corresponding bus bar to feed power thereto. The other two-pole breaker 20b and the single-pole breakers 21 then may be regarded as branch circuit protecting devices, deriving power from the bus bars 12 and 12a.

Figure 4:
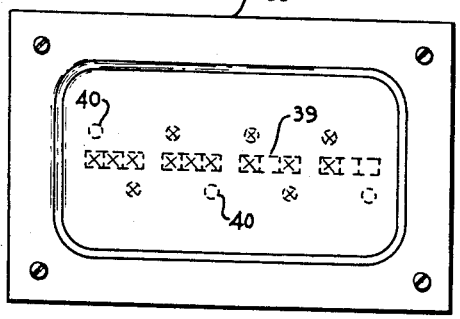
Figure 4 is a plan view of the front cover of the panelboard of Figure 1 before assembly on the panelboard and before removal of certain frangible portions or "knockouts."
Figure 2:
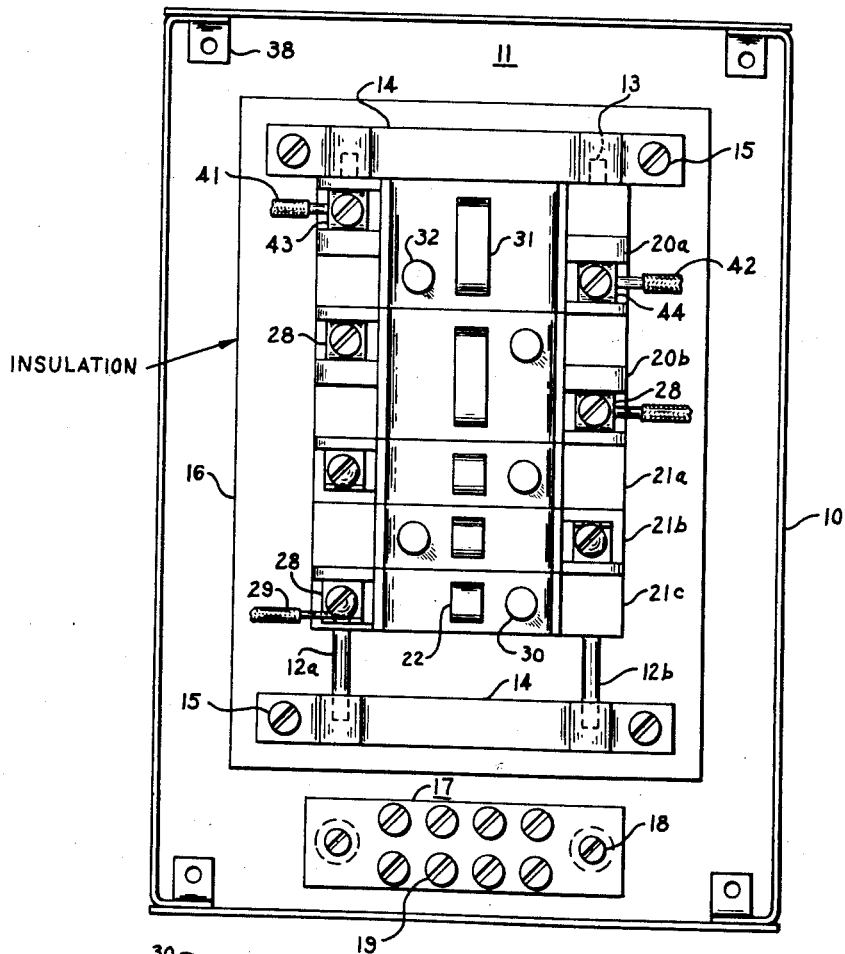
Figure 2 is a similar view of the panelboard of Figure 1, the front cover being removed.
Figure 3:
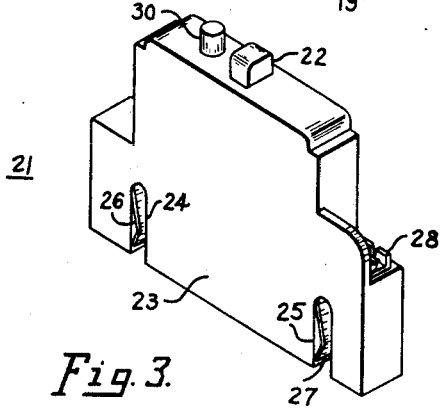
Figure 3 is a view in perspective of a circuit breaker such as is adapted for use in the panelboard of Figure 1.

It is an important aspect of my invention that as originally manufactured, the front cover 33 is preferably provided with "knockout" or frangible portions arranged in a pattern as indicated in Figure 4. It will be observed that the knockout portions are arranged in four groups and that each group comprises an elongated central knockout portion accompanied by two generally circular knockout portions 40 at either side thereof. The elongated central portion, furthermore, comprises three distinct subportions which may be individually removed. Although the groups of knockout portions are identical, various portions thereof may be removed in order to provide keying means to accommodate either single or double pole breakers while yet providing the equal distribution of loading on the bus bars. Thus for the number and arrangement of breakers shown in Figure 2 comprising one main two-pole breaker followed by a second two-pole breaker, three single-pole breakers and one vacant space, the knockouts would be removed in the manner indicated in Figure 4, that is, the portions marked by an "X" would be removed and the portions 39 and 40 unmarked would be left in place. A panelboard of the size indicated comprises eight single-pole breaker spaces or locations, or four double-pole breaker spaces or locations. In addition, a single-pole breaker may be mounted in only one particular predetermined endwise position in a given location and the predetermined endwise positions alternate as we proceed from one end of the row of locations to the other. Moreover, the two-pole breakers may be mounted in either one of the two endwise positions, that is, they are reversible end-for-end and will still be accommodated by the knockout openings provided. Such reversing of a double-pole breaker, however, has no unbalancing effect on the equal distribution of current loading, since in either position the two circuit breakers carried within the two-pole breaker housing are connected to two different bus bars due to the fact that the two terminals of the type of terminal 26 are located at opposite ends of the assembly and hence the load of the pair of breakers is always equally divided.

It will be seen that I have provided a simple and effective means for insuring the equal distribution of circuit loading on bus bars in a panelboard. While I have shown one embodiment of my invention it will be apparent that many modifications thereof will occur to those skilled in the art and I, therefore, wish to cover all such modifications as may be covered by the appended claims.

What I claim as new and desire to secure by Letters Patent of the United States is:

1. An enclosed electrical apparatus assembly comprising a plurality of electrical control devices, an open-front enclosure for said devices, at least two electrical bus bars in said enclosure, each of said devices being selectively mountable in said enclosure in one of a plurality of positions, said device when in one of said positions making electrical contact with one of said bus bars and when in another of said positions making contact with another of said bus bars, a removable cover for said open front of said enclosure, and keying means carried by said cover and said devices and cooperable to prevent assembly of said cover when at least one of said devices is mounted in a position other than a predetermined position.

2. An enclosed electrical apparatus assembly comprising a plurality of plug-in mounted electrical control devices, housing means for said devices including an open-front enclosure, a plurality of electrical bus bars in said enclosure, each of said devices being selectively mountable in said enclosure in one of a plurality of positions said device when in one of said positions making electrical plug-in type contact with one of said bus bars and when in another of said positions making electrical plug-in type contact with another of said bus bars, a removable cover for said open front of said enclosure and keying means carried by said cover and said devices and cooperable to prevent assembly of said cover when at least one of said devices is mounted in a position other than a predetermined position, said keying means comprising projecting portions of said devices and openings in said cover adapted to fit closely around said projecting portions of said devices in said assembled position.

3. An enclosed electrical apparatus assembly comprising an open-front enclosure, a pair of bus bars supported in generally parallel spaced relation in said enclosure, a plurality of electrical control devices adapted to be mounted in said enclosure on said bus bars, each of said devices having a pair of metal connectors at opposite ends, only one of said connectors constituting an electrical terminal connector for the device and the spacing between said connectors being substantially the same as the spacing between said bus bars whereby each of said devices is mountable on said bus bars in one of two endwise reversed positions with said electrical terminal connector contacting one of said bus bars, a removable cover for said enclosure, said cover having openings therein and said devices having projecting portions thereof adapted to project through said openings when said cover is in fully assembled condition and each of said devices is in a predetermined one of said two possible endwise reversed positions, said projecting portions of said devices being adapted to prevent assembly of said cover in said fully assembled condition when said device is in the other of said two possible endwise positions.

4. An enclosed electrical apparatus assembly comprising an open-front enclosure, a plurality of electrical bus bars mounted in said enclosure, a plurality of manually operable electrical control devices adapted to be mounted in said enclosure, said enclosure having a predetermined number of device locations therein, only one device being mountable at each location, each of said devices being selectively mountable at each location in one of two positions in one of which positions it makes electrical contact with one of said bus bars and in the other of which positions it makes contact with a different one of said bus bars, a cover for the open front of said enclosure, and keying means carried by said cover and said devices and cooperable to prevent assembly of said cover on said enclosure when one of said devices is mounted in one of said locations in a position other than a predetermined position.

5. An enclosed electrical apparatus assembly comprising an open-front enclosure, a plurality of electrical bus bars mounted in said enclosure, a plurality of manually operable electrical control devices adapted to be mounted in said enclosure and having keying projecting portions thereon, said enclosure having a predetermined number of device locations therein arranged in a row, only one device being mountable at each location, each of said devices being selectively mountable at each location in one of two positions in one of which positions it makes electrical contact with one of said bus bars and in the other of which positions it is inverted and makes contact with a different one of said bus bars, a cover for the open front of said enclosure, said cover having knockout portions corresponding to said device locations arranged in a row generally centrally of said cover, the knockout portions at each said device location corresponding in outline to the said projecting portions of said devices and the outline of the knockout portions at each succeeding device location being substantially the inverted image of the knockout portion outline at the adjacent locations.

6. An enclosed electrical apparatus assembly comprising an open-front enclosure, a plurality of electrical bus bars mounted in said enclosure and a plurality of electrical control devices adapted to be mounted in said enclosure and having keying projections thereon, a front cover comprising a generally planar member having a plurality of discrete knockout portions adapted to be removed to provide openings in said cover to receive said keying projections, and comprising two generally parallel rows longitudinally offset with respect to each other.

7. The invention as set forth in claim 6 wherein a central row of knockout portions is provided substantially midway between the two generally parallel longitudinally offset rows, the said central row including knockout portions corresponding to each knockout portion of each of the two said offset rows.

References Cited in the file of this patent

UNITED STATES PATENTS

| | | |
|---|---|---|
| 945,995 | Weeks | Jan. 11, 1910 |
| 1,219,864 | Platt | Mar. 20, 1917 |
| 1,938,309 | Williams | Dec. 5, 1933 |
| 2,143,342 | Beersman | Jan. 10, 1939 |
| 2,281,958 | Snavely | May 5, 1942 |
| 2,288,241 | Holcomb | June 30, 1942 |
| 2,530,548 | Stanley | Nov. 21, 1950 |
| 2,725,542 | Born | Nov. 29, 1955 |
| 2,767,353 | Kingdon | Oct. 16, 1956 |

FOREIGN PATENTS

| | | |
|---|---|---|
| 106,197 | Australia | Dec. 16, 1938 |